United States Patent
Nanno et al.

(10) Patent No.: US 6,620,549 B2
(45) Date of Patent: Sep. 16, 2003

(54) ALKALINE STORAGE BATTERY

(75) Inventors: Tetsuo Nanno, Osaka (JP); Kazuhiro Ota, Hyogo (JP); Hiromu Matsuda, Hyogo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/152,128

(22) Filed: May 20, 2002

(65) Prior Publication Data

US 2002/0172758 A1 Nov. 21, 2002

Related U.S. Application Data

(63) Continuation of application No. 09/334,492, filed on Jun. 16, 1999, now abandoned.

(30) Foreign Application Priority Data

Jun. 16, 1998 (JP) .............................. 10-167872

(51) Int. Cl.[7] .......................... H01M 4/58; H01M 4/52; C01G 53/04; C01G 51/04
(52) U.S. Cl. ................. 429/223; 423/594.3; 423/594.5; 429/218.2; 429/231.3
(58) Field of Search ............................ 429/218.2, 223, 429/231.3; 423/594.3, 594.5

(56) References Cited

U.S. PATENT DOCUMENTS

| | | | |
|---|---|---|---|
| 5,523,182 A | 6/1996 | Ovshinsky et al. | 429/223 |
| 5,702,762 A * | 12/1997 | Baba et al. | 427/212 |
| 5,744,259 A * | 4/1998 | Ohta et al. | 429/59 |
| 5,965,295 A | 10/1999 | Bando et al. | 429/223 |
| 6,057,057 A | 5/2000 | Yano et al. | 429/223 |
| 6,083,642 A * | 7/2000 | Kato et al. | 429/218.1 |
| 6,114,063 A | 9/2000 | Katsumoto et al. | 429/223 |

FOREIGN PATENT DOCUMENTS

| | | |
|---|---|---|
| JP | 5-242886 | 9/1983 |
| JP | 61-124061 | 6/1986 |
| JP | 62-237667 | 10/1987 |
| JP | 7-78613 | 3/1995 |
| JP | 8-148146 | 6/1996 |
| JP | 9-45323 | 2/1997 |
| JP | 10-125315 | 5/1998 |

* cited by examiner

Primary Examiner—Wayne A. Langel
Assistant Examiner—Jonas N. Strickland
(74) Attorney, Agent, or Firm—RatnerPrestia

(57) ABSTRACT

An alkaline storage battery, a positive electrode material for the alkaline storage battery, and a method of preparation for the positive electrode material are disclosed. The positive electrode material is made up of nickel hydroxide particles that have cobalt oxyhydroxide on their surface. The particles may be prepared by a process in which α-cobalt hydroxide adhered to the surface of the nickel hydroxide particles is oxidized to cobalt oxyhydroxide. The battery has a superior rate of utilization of active material, cycle life, and discharge characteristics.

12 Claims, 1 Drawing Sheet

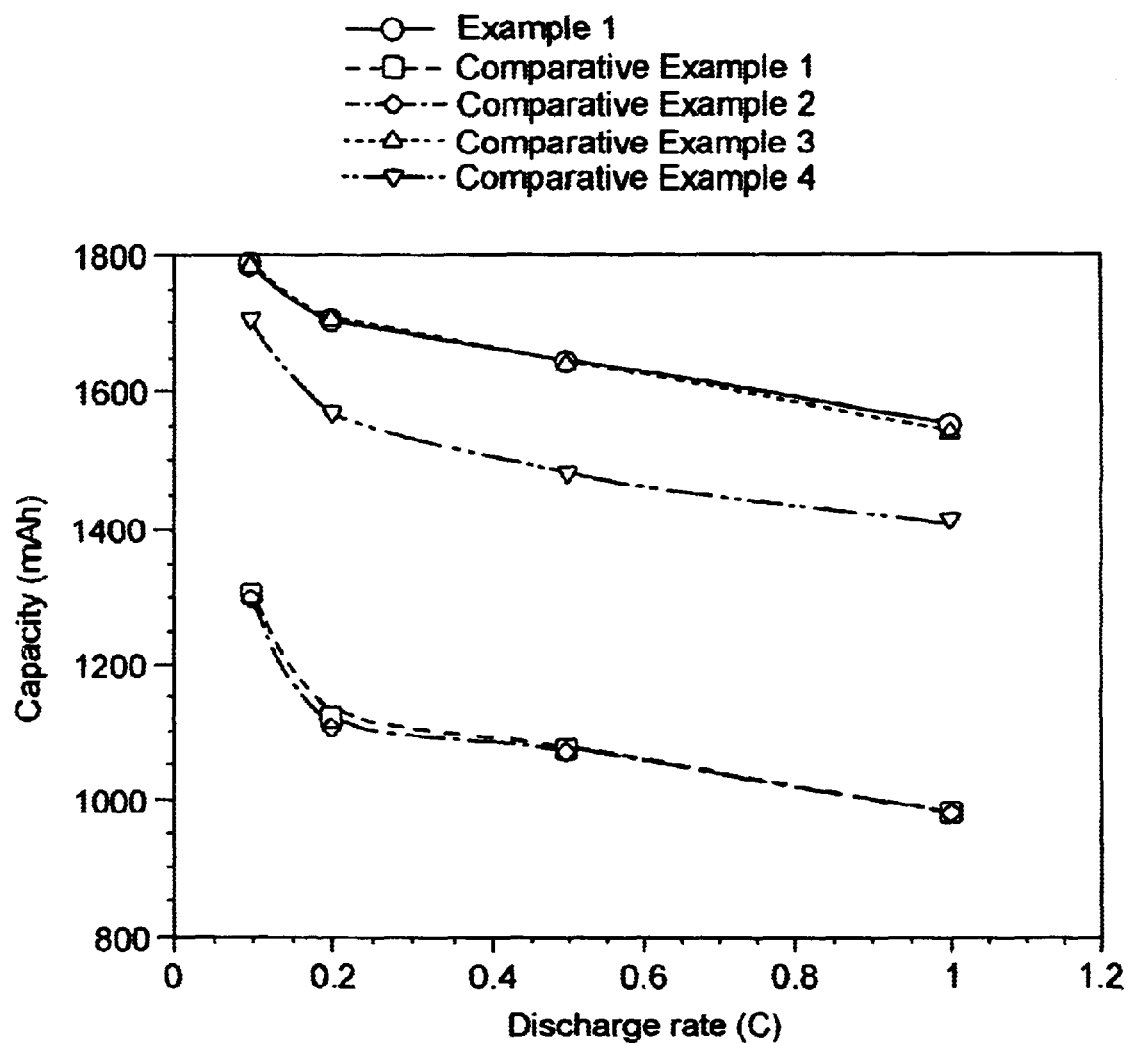

ALKALINE STORAGE BATTERY

This application is a continuation of U.S. patent application Ser. No. 09/334,492, filed Jun. 16, 1999 which is now abandoned.

The present invention relates to alkaline storage batteries such as nickel-hydrogen storage batteries, nickel-cadmium storage batteries, and nickel-zinc storage batteries.

FIELD OF THE INVENTION

BACKGROUND OF THE INVENTION

In recent years, alkaline storage batteries are in wide use ranging over power sources of various portable equipment to large size batteries for electric vehicles. In these alkaline batteries, nickel hydroxide electrode is generally employed as the positive electrode.

The methods of manufacturing nickel hydroxide electrodes can be broadly divided into two types, namely, sintered type and paste type. Sintered electrodes are made by immersing in an alkaline solution after immersing in a nickel nitrate solution or nickel sulfate solution and suffer the problem of complication of the manufacturing process and a low capacity density. On the other hand, paste type nickel electrodes are made by filling an active material primarily composed of nickel hydroxide onto a high-porosity foamed or fibrous substrate; their manufacturing process is simple and it is possible to achieve a high capacity.

As the nickel hydroxide itself has a low electric conductivity, rate of utilization of the positive active material tends to be low when filling it alone on the substrate because transfer of electrons cannot be smoothly performed. In order to solve this problem, a method is widely employed in which a cobalt compound is added to the positive active material paste. This is based on the understanding that the cobalt compound is easily oxidized during the initial charge to become high electric-conductivity cobalt oxyhydroxide thus functioning as electrically conducting networks among nickel hydroxide particles and between the current collector and nickel hydroxide particles. However, as cobalt is rare, it is necessary to form enough electrically conducting networks by addition of a smaller quantity of cobalt compound in order to provide a lower-cost battery as well as to achieve a further higher capacity.

In order to solve these problems, many proposals have been made as to the quantity and conditions of adding cobalt compounds such as metallic cobalt, cobalt oxide, cobalt hydroxide, etc. More recently, proposals have been made to cover the surface of nickel hydroxide particles with cobalt hydroxide to obtain an enhanced effect of addition of cobalt hydroxide of a smaller quantity.

For example, Japanese Laid-Open Patent Application No. Hei 9-45323 proposes a process of obtaining an active material for alkaline storage batteries by adding nickel hydroxide powder into an aqueous solution of cobalt compound followed by neutralizing in an aqueous solution adjusted to pH 10–12, then suspending in an alkaline aqueous solution and electrochemically oxidizing it. However, the cobalt oxyhydroxide obtained by electrochemical oxidation of β-type cobalt hydroxide has a specific electric conductivity on the order of $10^{-5}$ S/cm, which is not very high. This process also suffers the problem of including a step of electrochemical oxidation of powders which tends to be complicated.

Also, in Japanese Laid-Open Patent Application No. Hei 8-148146, for example, it is proposed to improve the rate of utilization of the positive active material by producing higher-order cobalt oxides having a high electric conductivity on the surface of nickel hydroxide by heat treatment of nickel hydroxide of which the surface has been covered with cobalt hydroxide in an environment of coexisting oxygen and alkali metal hydroxides. However, in this method, tricobalt tetraoxide tends to be produced as a by-product while cobalt hydroxide is being oxidized, suggesting that not all the cobalt compound is effectively functioning thus not exhibiting full effect.

Also, as the reaction is one which takes place at the interface among vapor phase, solid phase, and liquid phase, the method has a drawback of suffering considerably high non-uniformity of reaction and of complication of the process of producing a high electric-conductivity cobalt compound on the surface of nickel hydroxide powder.

Further, though Japanese Laid-Open Patent Application No. Hei 10-125315 discloses an active material primarily composed of nickel hydroxide the surface of which is covered with a cobalt compound, it has been difficult to uniformly and stably produce cobalt oxyhydroxide having an especially high electric conductivity on nickel hydroxide.

The present invention addresses the previously existing problems as described above. It is an object of the invention to eliminate the problems encountered in oxidizing cobalt hydroxide and to produce cobalt oxyhydroxide with a high electric conductivity on the surface of nickel hydroxide with uniformity and stability while simplifying the process, thus improving the rate of utilization of the positive active material and discharge characteristic of alkaline storage batteries.

SUMMARY OF THE INVENTION

In accomplishing the above object, the present invention first produces α-type cobalt hydroxide on the surface of nickel hydroxide of the positive active material of an alkaline storage battery, followed by oxidizing treatment of it with an oxidizing agent such as sodium hypochlorite or potassium permanganate thereby producing cobalt oxyhydroxide with a high electric conductivity on the surface of nickel hydroxide with simplicity, uniformity and stability.

The positive active material for alkaline storage batteries as obtained above is subsqeuntly filled onto foamed metal and the like to obtain an electrode for alkaline storage batteries. The present invention also intends to improve the rate of utilization of the positive active material and discharge characteristic by making its specific electric conductivity to within the range 1 to $10^{-4}$ S/cm.

The present invention utilizes a positive active material obtained by dispersing nickel hydroxide in an aqueous solution of cobalt (II) such as cobalt nitrate or cobalt sulfate, neutralizing it with a hydroxide of an alkali metal to render α-type cobalt hydroxide adhere on the surface of nickel hydroxide, followed by treating with an oxidizing agent to produce cobalt oxyhydroxide with a high electric conductivity on the surface of the active material. By forming a high electric conductivity cobalt oxyhydroxide on the surface of the active material, the low rate of utilization of the positive active material attributable to the property of a low electric-conductivity of nickel hydroxide can be significantly improved.

Here, it is conceivable that the higher the electronic conductivity of the cobalt hydroxide on the surface is, the more improved are the rate of utilization of the positive active material and discharge characteristic. According to the present invention, the specific electric conductivity can be made to such a high value as 1 to $10^{-4}$ S/cm.

Also, as the present invention uses α-type cobalt hydroxide as the starting material, oxidizing treatment is simple, namely, α-type cobalt hydroxide can be rapidly converted into a higher-order cobalt oxide with a high electric conductivity by simply adding an oxidizing agent such as aqueous solution of sodium hypochlorite, aqueous solution of hydrogen peroxide, aqueous solution of potassium permanganate, and the like. This reaction being a reaction at a solid-liquid interface, the oxidizing treatment can be performed relatively uniformly. Furthermore, this process can be performed in a batch immediately after the above-described process of coating the surface of nickel hydroxide particles by α-type cobalt hydroxide.

In doing this, it is good to keep the pH of the reaction mixture to be used in rendering α-type cobalt hydroxide adhere on the surface of nickel hydroxide in the range 8 to 10. When the pH of the reaction mixture is too low, it is not possible to produce enough quantity of α-type cobalt hydroxide on the nickel hydroxide particle surface. Also, when the pH is higher than 10, greenish-blue α-type cobalt hydroxide rapidly changes to white-peach colored β type and the subsequent oxidizing treatment with an aqueous solution of sodium hypochlorite is made difficult. Furthermore, when stirring efficiency during subsequent neutralization is poor, the pH locally becomes higher than 10 making it difficult to uniformly produce α-type cobalt hydroxide on the surface of nickel hydroxide particles.

Also, in the above active material of the present invention, the quantity of cobalt oxyhydroxide covering nickel hydroxide surface is chosen to be 0.5 to 10% by weight of nickel hydroxide. When the quantity of α-type cobalt hydroxide covering nickel hydroxide surface is too small, it is not possible to provide a high enough electric conductivity on the surface thus not exhibiting its effect. Conversely, when the quantity is too large, a large quantity of expensive cobalt compound will be consumed thus making the cost high while causing an undesirable decrease in the filling density of the positive active material. The adequate quantity of α-type cobalt hydroxide for covering is 0.5 to 10% by weight of nickel hydroxide, preferably 2 to 5%.

As has been described above, with the present invention, a positive active material having a high rate of utilization and a superior discharge characteristic can be produced more easily by the addition of a smaller quantity of the cobalt compound.

BRIEF DESCRIPTION OF THE DRAWING

The FIGURE is a graph showing relationship between discharge rate and capacity.

DESCRIPTION OF THE PREFERRED EMBODIMENTS

A practical description of an exemplary embodiment of the present invention will be given in the following together with a description of comparative examples. It will be made clear that the alkaline storage battery described as an example has a high charge-discharge capacity, superior discharge characteristic and superior cycle characteristic.

EXAMPLE 1

[Preparation of Active Material]

A quantity of 100 grams of $Ni(OH)_2$ powder was added to 500 mL of 0.025 mol $CoSO_4$ aqueous solution containing a small quantity (1 mL) of hydrazine, into which 0.1 mol NaOH aqueous solution was slowly dropped while violently stirring the $CoSO_4$ solution to adjust the pH of the resulting reaction mixture to 9.0 and the surface, of $Ni(OH)_2$ was covered with greenish-blue α-$Co(OH)_2$. Stirring was continued until 15 minutes after the addition of the NaOH aqueous solution was finished. Subsequently, 100 mL of NaClO aqueous solution with an effective chlorine concentration of 5% was added to the above suspension, which was stirred for additional 30 minutes. The obtained black suspension was left to stand and washed five times by decantation using 500 mL of ion-exchanged water, after which powder was filtered and dried at 60 degrees C. An inductively-coupled plasma-atomic emission spectroscopy of the quantity of Ni and Co elements in the active material showed that the obtained powder had a weight ratio of $Ni(OH)_2/CoOOH=95.7/4.3$. Its specific electric conductivity as measured by 4-probe method was $10^{-3}$ S/cm under a load of 1000 kg/cm$^2$.

Nickel foamed metal with a porosity 95% was used as a substrate. Paste was prepared by adding approximately 20 mL of ion-exchange water into 100 grams of the above active material. A positive electrode (35 mm×85 mm×0.85 mm, porosity 35%, weight of the filled material 6.5 gram) was prepared by filling the paste onto the foamed metal, drying and then pressing.

[Preparation of the Negative Electrode]

Hydrogen absorbing alloy was used for the negative electrode. Paste prepared by pulverizing $MmNi_{3.7}Mn_{0.4}Al_{0.3}Co_{0.6}$, being one of $MmNi_5$ metals, and allowing it to pass a 360 mesh and then adding a CMC aqueous solution with a concentration of 1.5% by weight was coated on a punched metal made of nickel-plated iron. After drying and pressing the product, a water dispersion of 5% fluorine resin was added. It was then cut to the same size as the positive electrode.

[Fabrication of a Battery]

A sealed type prismatic nickel-hydrogen storage battery was fabricated by combining a sheet of the positive electrode and two sheets of the negative electrode and a separator made of nonwoven fabric of polypropylene after hydrophilic treatment. As the liquid electrolyte, adequate quantity of a solution prepared by dissolving 10 grams/L of lithium hydroxide into a KOH aqueous solution with a specific gravity of 1.30 was used.

COMPARATIVE EXAMPLE 1

In preparing the positive active material, the surface of $Ni(OH)_2$ particles was covered with α-$Co(OH)_2$ as in the case of Example 1. The positive electrode was prepared in the same manner as in Example 1 with the exception of subsequent treatment with NaClO aqueous solution. Measurement of the quantity of Ni and Co elements in the active material by an inductively-coupled plasma-atomic emission spectroscopy revealed that the positive active material had a weight ratio of $Ni(OH)_2/Co(OH)_2=95.5/4.5$. The specific electric conductivity of the active material as measured by 4-probe method was below the measurable limit ($10^{-8}$ S/cm) under a load of 1000 kg/cm$^2$.

COMPARATIVE EXAMPLE 2

In preparing the positive active material, though the reaction mixture was neutralized with an alkali as in the above Example 1, the pH of the reaction mixture was adjusted to be alkaline up to 13 and β-type cobalt hydroxide was rendered to precipitate on the surface of nickel hydroxide particles. Subsequently, a positive electrode was prepared in the same manner as in Example 1 with the exception of treatment with a NaClO aqueous solution.

Measurement of the quantity of Ni and Co elements in the active material by an inductively-coupled plasma-atomic emission spectroscopy revealed that the obtained powder had a weight ratio of $Ni(OH)_2/Co(OH)_2=95.8/4.2$. The specific electric conductivity of this material as measured by 4-probe method was below the measurable limit ($10^{-8}$ S/cm) under a load of 1000 kg/cm$^2$.

COMPATATIVE EXAMPLE 3

Nickel hydroxide particles of which the surface had been covered with β-type cobalt hydroxide were prepared in the same manner as in Comparative Example 2. Subsequently, the active material prepared was oxidized in the presence of alkali by heat treatment at 100 degrees C. for 1 hour in the presence of an aqueous solution of 40% by weight NaOH, washed with water and dried to obtain a positive active material. A positive electrode was obtained through the same subsequent process as in Example 1. Measurement of the quantity of Ni and Co elements in the active material by an inductively-coupled plasma-atomic emission spectroscopy revealed that the obtained powder had weight ratio of $Ni(OH)_2/Co(OOH)_2=95.8/4.2$. The specific electric conductivity of this active material as measured by 4-probe method was $10^{-4}$ S/cm under a load of 1000 kg/cm$^2$.

COMPARATIVE EXAMPLE 4

Paste was prepared by mixing nickel hydroxide and cobalt oxide of 10% by weight of nickel hydroxide and adding ion-exchange water, which was then filled onto foamed metal to obtain a positive electrode. Subsequent process was the same as in Example 1.

For each of Comparative Examples 1 to 4, a sealed prismatic nickel-hydrogen storage battery was fabricated by using the same negative electrode, separator and liquid electrolyte and through the same process as in Example 1.

Rate of utilization of Active Material and Charge-Discharge Cycle Life of Each Battery:

For each of the batteries fabricated in Example 1 and Comparative Examples 1 to 4, charge-discharge cycle test was conducted in which one cycle consisted of charging to 120% at 25 degrees C. at 0.1C rate and then discharging at 25 degrees C. at 0.2C rate until 0.9 V. The rate of utilization of the active material and the battery capacity at the 10th cycle and charge-discharge cycle life of each battery were obtained. In the cycle life test, the number of cycles reached until the capacity had decreased to 80% of the capacity at the 10th cycle was obtained. Table 1 shows the test results.

TABLE 1

|  | Rate of utilization of active material at 10th cycle (%) | Discharge capacity at 10th cycle (mAh) | Charge-discharge cycle life (cycles) |
| --- | --- | --- | --- |
| Example 1 | 100 | 1702 | 263 |
| Comparative Example 1 | 73 | 1122 | 187 |
| Comparative Example 2 | 72 | 1107 | 190 |
| Comparative Example 3 | 100 | 1711 | 224 |
| Comparative Example 4 | 105 | 1644 | 197 |

It can be seen from Table 1 that Comparative Examples 1 and 2 have a lower rate of utilization and shorter life although the quantity of cobalt hydroxide added was the same as Example 1 of the present invention. Though the surface of nickel hydroxide had been covered with α-type cobalt hydroxide in Comparative Example 1 and with β-type cobalt hydroxide in Comparative Example 2, there was essentially no difference between the two conceivably because α-type cobalt hydroxide had changed to β type by the addition of the liquid electrolyte immediately. In the case of Comparative Example 4 in which CoO had been added, while the initial rate of utilization was superior, the capacity was lower as the filling density of the active material had been rendered lower, and the cycle life was inferior to Example 1. While the rate of utilization and discharge capacity of Comparative Example 3 were similar to Example 1, the cycle life was inferior.

High-Rate Discharge Characteristic of Each Battery:

For each of the batteries fabricated in Example 1 and Comparative Examples 1 to 4, the capacity was compared by charging to 120% at 25 degrees C. at 0.1C rate followed by discharging at 25 degrees C. at 0.1C, 0.2C, 0.5C and 1C rates. The FIGURE shows the result.

While there was essentially no difference between Example 1 and Comparative Example 3, Comparative Example 4 showed a large capacity at lower discharge rates but the capacity decreased with increasing discharge rate. With Comparative Examples 1 and 2, as the quantity of addition of cobalt compound was too small, the discharge characteristic was poor.

As has been described above, it is possible in the present invention to render α-type cobalt hydroxide adhere on the surface of nickel hydroxide particles, and, by subsequent oxidizing treatment with an oxidizing agent, to render high specific electric-conductivity cobalt oxide adhere on the surface of nickel hydroxide with simplicity and stability. As a result, it is possible to achieve a high rate of utilization of the active material, a long cycle life, and a superior discharge characteristic in alkaline batteries employing a nickel positive electrode.

What is claimed is:

1. A method for forming a positive electrode material, the method comprising:

adding nickel hydroxide particles to an aqueous solution of a cobalt salt;

adjusting the pH to within the range 8–10 and forming α-cobalt hydroxide on the surface of the nickel hydroxide particles; and adding potassium permanganate and oxidizing the α-cobalt hydroxide on the surface of the nickel hydroxide particles to cobalt oxyhydroxide.

2. The method of claim 1 in which the oxidizing agent is sodium hypochlorite.

3. The method of claim 1 in which the oxidizing agent is hydrogen peroxide.

4. The method of claim 1 in which the oxidizing agent is added immediately after formation of the α-cobalt hydroxide on the surface of the nickel hydroxide particles.

5. The method of claim 4 in which in which the quantity of cobalt hydroxide formed on the surface of the nickel hydroxide particles is 0.5 to 10% by weight of the nickel hydroxide particles.

6. The method of claim 5 in which the positive electrode material has a specific electric conductivity of from 1 to $10^{-4}$ S/cm under a load of 1000 kg/cm$^2$ by a 4-probe method.

7. The method of claim 6 in which the quantity of cobalt hydroxide formed on the surface of the nickel hydroxide particles is 2 to 5% by weight of the nickel hydroxide particles and the specific electric conductivity of the positive electrode material is from 1 to $10^{-3}$ S/cm under a load of 1000 kg/cm² by the 4-probe method.

8. A method for forming a positive electrode material, the method comprising the steps of:

dispersing nickel hydroxide particles in an aqueous solution of a cobalt (II) salt to produce a reaction mixture;

adding a hydroxide of an alkali metal to the reaction mixture and adhering the α-cobalt hydroxide on the surface of the nickel hydroxide particles, in which the pH of the reaction mixture is maintained in the range of 8 to 10; and forming the positive electrode material by adding potassium permanganate to the reaction mixture and oxidizing the α-cobalt hydroxide to cobalt oxyhydroxide.

9. The method of claim 8 in which the oxidizing agent is selected from the group consisting of sodium hypochlorite, hydrogen peroxide, and potassium permanganate.

10. The method of claim 8 in which in which the quantity of cobalt hydroxide formed on the surface of the nickel hydroxide particles is 0.5 to 10% by weight of the nickel hydroxide particles; and the positive electrode material has a specific electric conductivity of from 1 to $10^{-4}$ S/cm under a load of 1000 kg/cm² by a 4-probe method.

11. The method of claim 10 in which the quantity of cobalt hydroxide formed on the surface of the nickel hydroxide particles is 2 to 5% by weight of the nickel hydroxide particles, and the specific electric conductivity of the positive electrode material is from 1 to $10^{-3}$ S/cm under a load of 1000 kg/cm² by the 4-probe method.

12. The method of claim 11 in which the oxidizing agent is added immediately after the α-cobalt hydroxide is adhered to the surface of the nickel hydroxide particles.

* * * * *